US010418065B1

(12) United States Patent
Guckenberger et al.

(10) Patent No.: US 10,418,065 B1
(45) Date of Patent: *Sep. 17, 2019

(54) INTELLIMARK CUSTOMIZATIONS FOR MEDIA CONTENT STREAMING AND SHARING

(71) Applicants:Advanced Anti-Terror Technologies, Inc., Clermont, FL (US); Ronald J. Guckenberger, Montverde, FL (US)

(72) Inventors: Elizabeth T. Guckenberger, Montverde, FL (US); Ronald J. Guckenberger, Montverde, FL (US)

(73) Assignee: Advanced Anti-Terror Technologies, Inc., Clermont, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/658,004

(22) Filed: Jul. 24, 2017

Related U.S. Application Data

(63) Continuation of application No. 13/986,200, filed on Apr. 11, 2013, now Pat. No. 9,715,899, which is a
(Continued)

(51) Int. Cl.
*G06F 17/22* (2006.01)
*G11B 27/031* (2006.01)
*G11B 27/11* (2006.01)
*G11B 27/10* (2006.01)
*G06F 3/01* (2006.01)
*G06F 17/21* (2006.01)

(52) U.S. Cl.
CPC ............ *G11B 27/031* (2013.01); *G06F 3/013* (2013.01); *G06F 17/214* (2013.01); *G11B 27/105* (2013.01); *G11B 27/11* (2013.01)

(58) Field of Classification Search
CPC ..... G11B 27/031; G11B 27/01; G11B 27/105; G06F 3/013; G06F 17/214
See application file for complete search history.

(56) References Cited

U.S. PATENT DOCUMENTS 4,845,645 A    7/1989  Matin et al.
5,961,462 A   10/1999  Loupas et al.
(Continued)

OTHER PUBLICATIONS

Mario Kleiner et al., What's New in Psychtoolbox-3?, Sep. 21, 2007, www.psychtoolbox.org, pp. 19-37.

*Primary Examiner* — Maikhanh Nguyen
(74) *Attorney, Agent, or Firm* — Terry M. Sanks, Esq.; Beusse Wolter Sanks & Maire, PLLC

(57) ABSTRACT

Improved automated methods of dynamically customizing displayed presentation of media content playback and/or live streams allow users to add, remove, change, and/or fuse displayed information of media content. Specifically, a user or users is able to add, remove, or move IntelliMark (Intelligent Bookmarks) that are separate parallel temporal bookmarks with associated dynamic run-time display manipulations within a separate file(s) that are neither part of the media content nor a live stream, and are stored within media players, enabling customized viewings without violating copyrights or terms of use for the underlying unaltered, un-copied original media content. In addition to an individual user customizing his own viewing experience, by sharing his IntelliMark file(s) with others that have access to the same media content, these others can experience the customized playback as constructed by other users. Further, users can evolve their own interpretations to share back to the original user and/or others.

20 Claims, 9 Drawing Sheets

Related U.S. Application Data continuation-in-part of application No. 13/066,707, filed on Apr. 20, 2011, now Pat. No. 8,953,909, which is a continuation-in-part of application No. 11/625,181, filed on Jan. 19, 2007, now Pat. No. 8,208,764.

(60) Provisional application No. 61/686,809, filed on Apr. 12, 2012, provisional application No. 61/343,060, filed on Apr. 22, 2010, provisional application No. 60/760,573, filed on Jan. 21, 2006.

(56) References Cited

U.S. PATENT DOCUMENTS

| | | | |
|---|---|---|---|
| 6,130,968 A | 10/2000 | McLan et al. | |
| 6,741,988 B1 * | 5/2004 | Wakefield | G06F 17/30 707/741 |
| 7,159,172 B1 | 1/2007 | Bentley et al. | |
| 7,823,055 B2 * | 10/2010 | Sull | G06F 17/30796 715/201 |
| 8,874,725 B1 | 10/2014 | Ganjam et al. | |
| 9,203,816 B2 * | 12/2015 | Brueck | H04N 21/2541 |
| 2003/0038754 A1 | 2/2003 | Goldstein et al. | |
| 2007/0044010 A1 * | 2/2007 | Sull | G06F 17/30796 715/202 |
| 2007/0260677 A1 | 11/2007 | DeMarco et al. | |
| 2009/0066722 A1 | 3/2009 | Kriger et al. | |
| 2009/0162024 A1 | 6/2009 | Bradicich et al. | |
| 2011/0058675 A1 * | 3/2011 | Brueck | H04N 21/2541 380/277 |
| 2011/0115819 A1 | 5/2011 | Hanson | |
| 2011/0223994 A1 | 9/2011 | Yerli | |

* cited by examiner

Fig 1 is a Flow Chart Diagram of IntelliMarks being added to a Video 'X' that resides on the users disc that is copyrighted so that the original media content cannot be legally copied or modified.
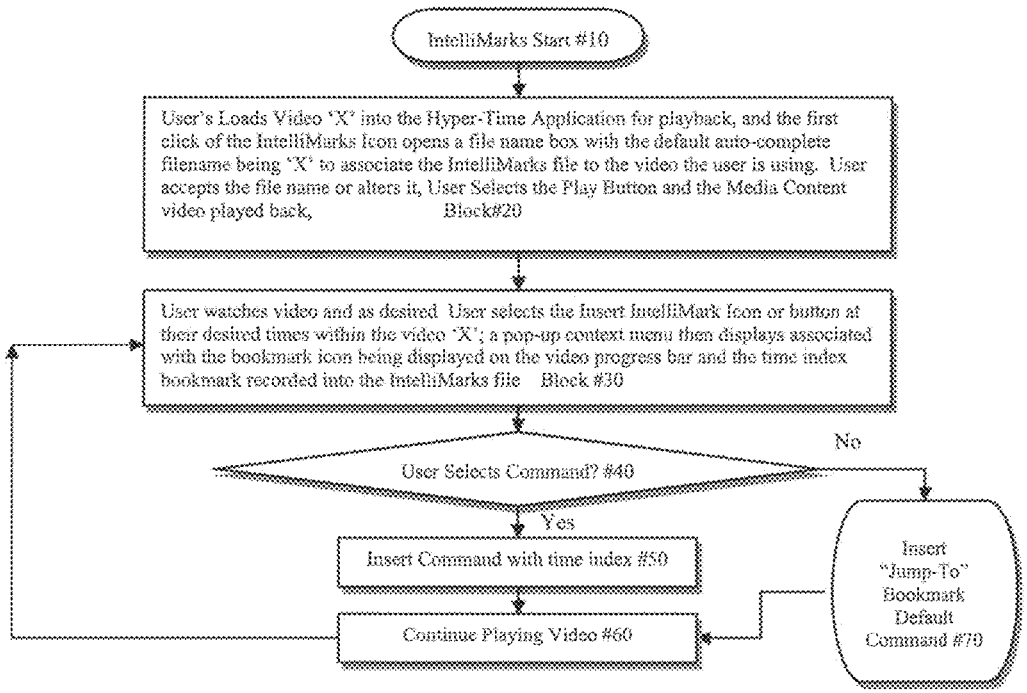

Figure 3 is example IntelliMarks file that illustrates one embodiment where the video name and locations are encapsulated along with indexes and commands are collected into a convenient sharable format (XML) file.

```xml
<MediaInformation>
    <PreviousMedia>
      <Type>None</Type>
      <FileName>C:\Users\LizLaptopPre\Videos\BestDemoVideos\VT\Liz Alessi Intro.wmv</FileName>
      <LastPosition>230065096</LastPosition>
      <Playback-Rate-Change>1.5</ Playback-Rate-Change>
    </PreviousMedia>
    <PreviousViewedMedia>
      <Media>
        <Type>None</Type>

<FileName>C:\Users\LizLaptopPre\Videos\BestDemoVideos\VT\VirtualTechDemo20110505B
EST_HP.wmv</FileName>
        <LastPosition>1421478749</LastPosition>
        <Zoom-Factor>1.5</Zoom-Factor>
      </Media>
      <Media>
        <Type>None</Type>

<FileName>C:\Users\LizLaptopPre\Videos\DemoVideos\DEL_TriviaGameWin7Mobile720.wm
v</FileName>
        <FirstPosition>10000001</FirstPosition>
        <Zoom-Factor>2</Zoom-Factor>
        <LastPosition>12990001</LastPosition>
        <Zoom-Factor>1</Zoom-Factor>
      </Media>
      <Media>
        <Type>None</Type>

<FileName>C:\Users\LizLaptopPre\Videos\DemoVideos\CAPTUREAvatarPromo.wmv</FileN
ame>
        <FirstPosition>10084</FirstPosition>
        <Playback-Rate-Change>0.5</ Playback-Rate-Change>
        <Zoom-Factor>1.5</Zoom-Factor>
        <Loop-Reps>4</ Loop-Reps >
        <LastPosition>11000001</LastPosition>
      </Media>
      <Media>
```

FIG. 3

```
        <Type>None</Type>

<FileName>C:\Users\LizLaptopPre\Videos\BestDemoVideos\VT\Liz Alessi
Intro.wmv</FileName>
        <FirstPosition>1000093</FirstPosition>
        <Zoom-Factor>2</Zoom-Factor>
        <LastPosition>230065096</LastPosition>
        <Loop-Reps>4</ Loop-Reps >
        <LastPosition>230065096</LastPosition>
        <Zoom-Factor>1</Zoom-Factor>
      </Media>
    </PreviousViewedMedia>
   </MediaInformation>
  </HyperTimeUser>
 </HyperTimeUserInformation>
</HyperTimeSettings>
```

Sharable XML files are the preferred format, however practitioners aware of the state-of-the-art can select any format they prefer such as excel spreadsheet, database look-ups, comma delimited files, etc.

CONT. FIG. 3

Fig 4 is a Flow Chart Diagram of IntelliMarks being automatically interpreted and executed from a separate XML file, dynamically at run-time altering the presentation of the media content without copying or modifying the underlying copyrighted media content that is illegal to copy or modify.
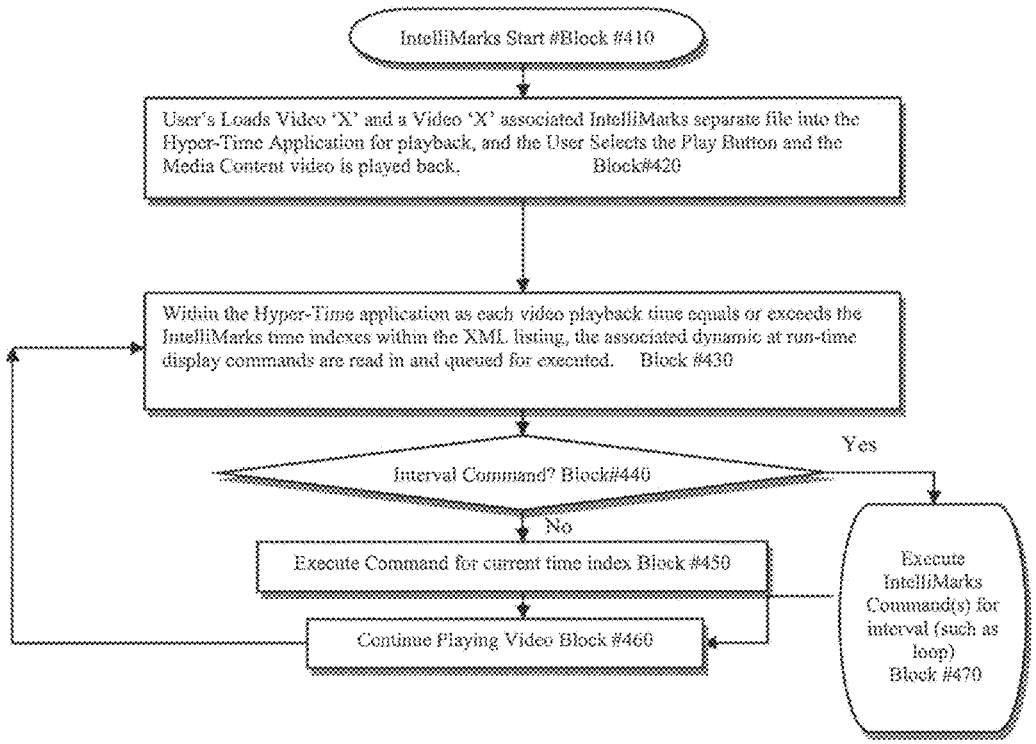

Fig 5 is a Flow Chart Diagram of IntelliMarks being created by the user and stored into a separate XML file that are indexes into separate files that are legally allowed to be partially copied and/or modified. The creation of the IntelliMarks is the same process as Fig 1, however the automated interpretation and execution as shown in the following Fig 6 is different where advantageous to the user.

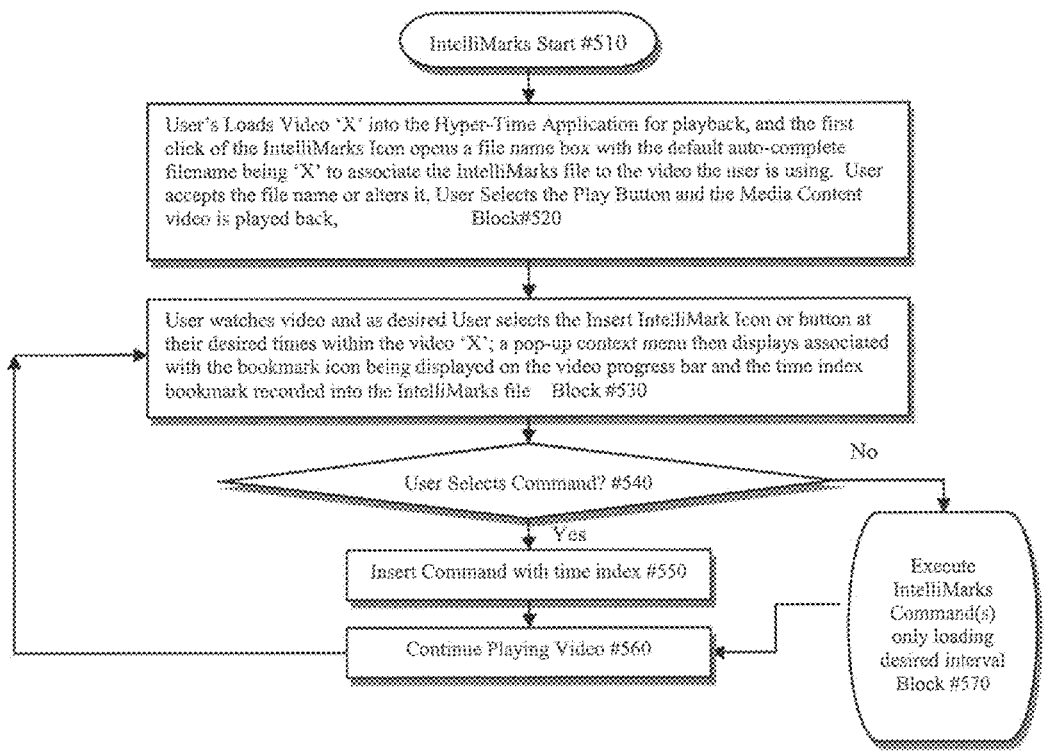

Fig 6 is a Flow Chart Diagram of IntelliMarks being automatically interpreted and executed from a separate XML file that are indexes into separate files that are legally allowed to be partially copied and/or modified..
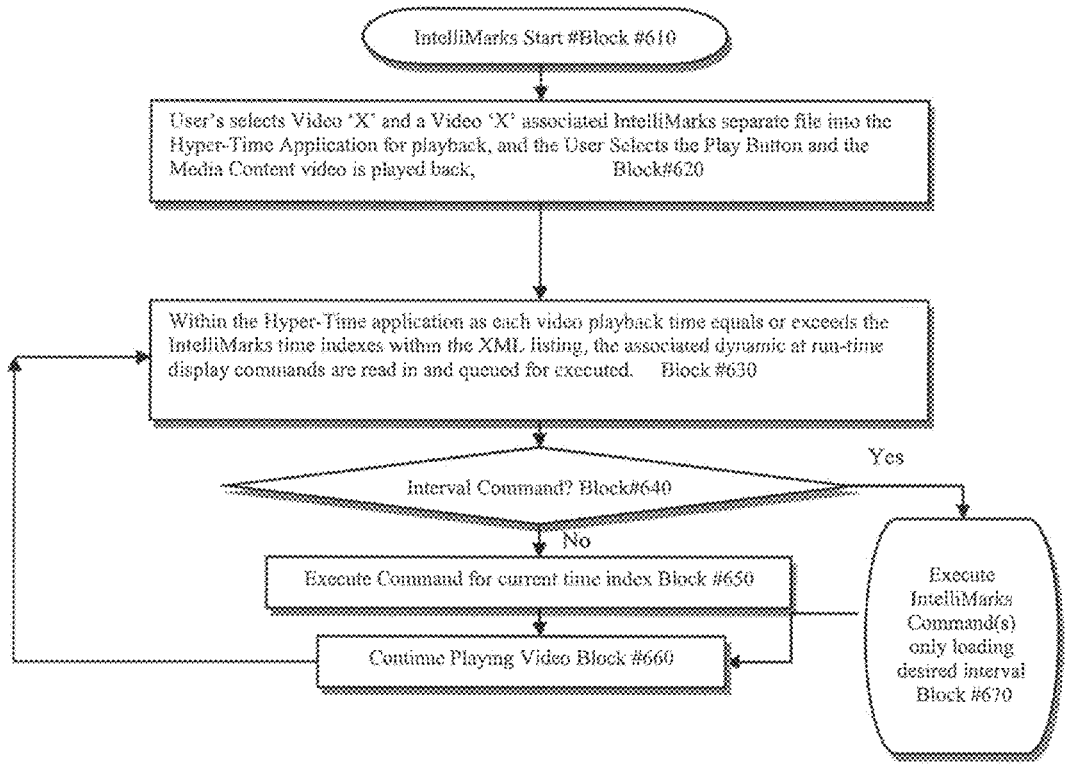

Fig 7 is an example of an IntelliMarks altered RSVP display with user customized font size and warping/distortion along with spacing to compensate for macular degeneration. The science is to exploit Human reading invariants in size and angles to map the textual and graphical display around the perceptual problem. A simple case to overcome central macular degeneration is RSVP of one word at time with the letters large enough to use the low resolution portions of the eye and aligned along a curve that avoids the degeneration central area of the eye (normally the high resolution area)

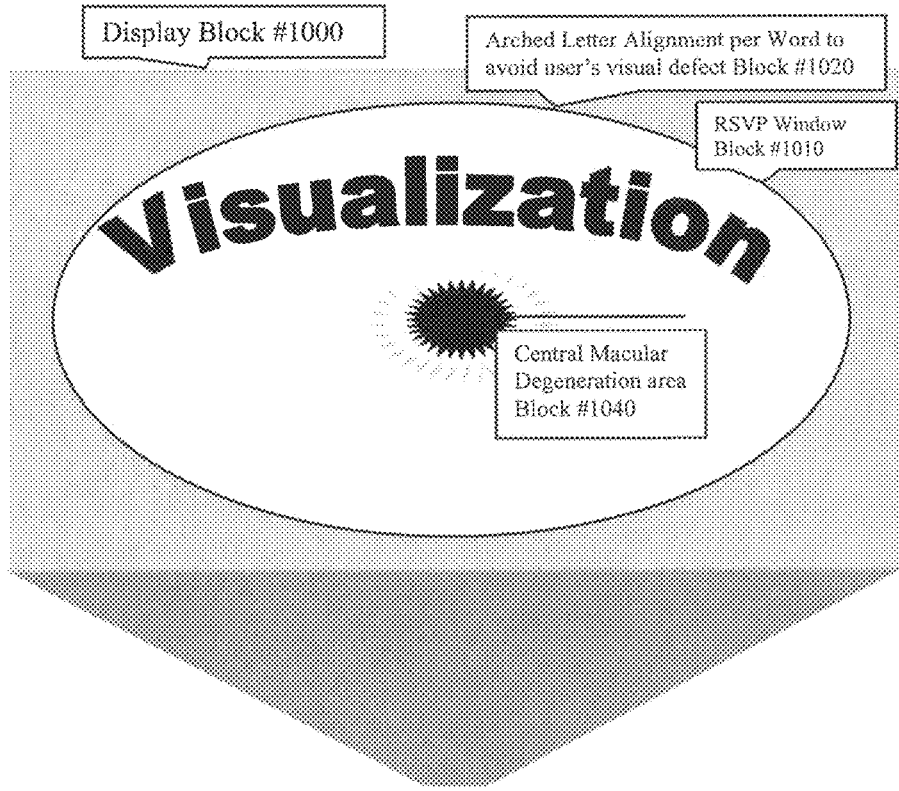

Fig 8 is a Screen Capture of IntelliMarks displaying the commands to select from within our Mirror Mimic Training application invention.
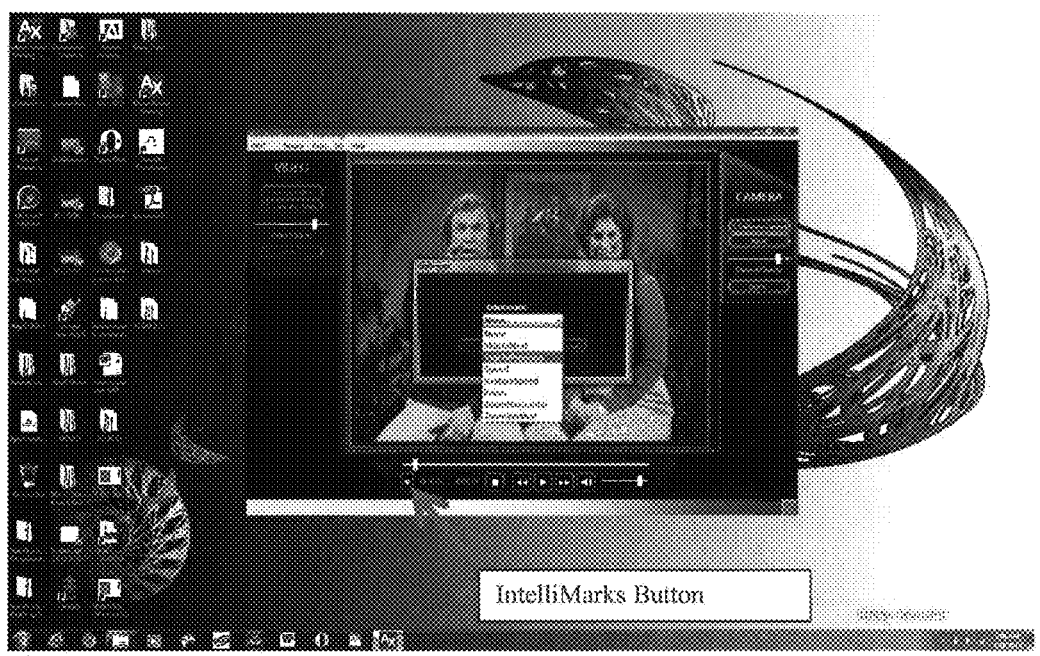

INTELLIMARK CUSTOMIZATIONS FOR MEDIA CONTENT STREAMING AND SHARING

CROSS REFERENCE TO RELATED APPLICATIONS

This application is a Continuation of U.S. application Ser. No. 13/986,200 filed Apr. 11, 2013, now U.S. Pat. No. 9,715,899 issued Jul. 25, 2017, which claims the benefit of U.S. Provisional Application No. 61/686,809 filed Apr. 12, 2012. U.S. application Ser. No. 13/986,200 is a Continuation-In-Part of U.S. application Ser. No. 13/066,707 filed Apr. 20, 2011, now U.S. Pat. No. 8,953,909 issued Feb. 10, 2015. U.S. application Ser. No. 13/066,707 claims the benefit of U.S. Provisional Application No. 61/343,060 filed Apr. 22, 2010. U.S. application Ser. No. 13/066,707 is a Continuation-In-Part of U.S. application Ser. No. 11/625,181 filed Jan. 19, 2007, now U.S. Pat. No. 8,208,764 issued Jun. 26, 2012, which claims the benefit of U.S. Provisional Application No. 60/760,573 filed Jan. 21, 2006. The entire contents of all of which are hereby incorporated by reference.

STATEMENT REGARDING FEDERALLY SPONSORED RESEARCH OR DEVELOPMENT

This invention was made with government support under Contract No. N68335-13-c0177. The government has certain rights in the invention.

BACKGROUND

Field

This IntelliMarks invention generally relates to new unobvious uses of separate parallel "special" bookmarking containing associated intelligent commands for altering the PRESENTATION of media content including: video; audio; rapid sequential visual presentation (RSVP) of text, graphics, symbology, etc.; and/or PowerPoint presentation, simulations, games, virtual or augmented reality, and/or any sequenced media or content. The invention's separate parallel "special" bookmarking containing associated intelligent commands that compiled into a separate file or files that are NOT embedded into the media content, and are NOT part of the media player. The invention enables users to dynamically customize the playback presentation of copyrighted media without infringing copyrights or terms of use; and/or selectively download intervals of interest from servers for customized playback presentations from media legally allowing such partial uses (saving file sizes and bandwidth); and/or include semi-transparent treatments of the content, and/or other content inclusive of additional separate layers that are linked and synchronized to media content. Entirely new levels and types of social network sharing and crowd sourcing customizations are enabled by users sharing IntelliMark files to others or on new commercial marketplaces where customers purchase IntelliMark files as companion sales to media content.

Prior Art

Previously, many content editors have enabled users to modify existing media content and produce new altered versions of the original content. Typically, the original media content is copied into a buffer, software manipulated, and a new altered version of the content is then output as a new file. Unfortunately, such copy and alter operations many times are infringements on the copyrights of the originator of the content, and/or a violation of the terms of use for said content. Huge legal and financial penalties are involved in any such infringements or violations even for private individuals that inadvertently make use of the media content wrongly.

The closest the prior art comes to teaching anything similar to the IntelliMarks invention are some of the more expensive video editing tools keep a copy of the original media content for configuration management advantages, enabling multiple derivative works to be produced without requiring error prone copies of copies. To be clear, each of the derivative works still violates copyrights of the original creator and/or terms of use. Further current video editing tools do not share their media customizations as a separate file; they embed changes within the video file and/or modify the output video format itself including illegal copies of portions of the original copyrighted content.

The video editing tools prior art is also restricted to static changes and static formatting of the new modified media content, and does not even mention dynamic at run-time modifications of the presentation of the unaltered underlying media content.

The video editing tools prior art is also restricted to static changes and static formatting of the new modified media content audio, semi-transparency, transition effects, zoom factors, etc. all are static changes made by the video editor which greatly limit the additional changes the viewing user can make; the prior art does not even mention dynamic at run-time modifications of the presentation audio, semi-transparency, transition effects, zoom factors, etc. made possible by the viewing user being able to adjust changes to the unaltered underlying media content.

The prior art we have researched contain no teachings of our new use of separate audio and video controls for our IntelliMark separately controlled Presentation of content. Even the expensive video editing tools freeze the audio levels and semi-transparency at the editing tool user's selected levels, leaving the viewing users without the capacities to customize to their preferences. IntelliMarks separate files and parallel methods preserves the original content intact, enables the viewing user to select their own preferences! IntelliMark users are not locked into and limited to the original editor tool user's selections. Further, an IntelliMarks viewing user can always select restore defaults to remove his own changes or the video editor's changes to the settings so the original media content levels are used.

The prior art we have researched contain no teaching of:
Separate indexes and associated display commands in separate files that can be reused with associated content without changing the original media content;
Sharing of indexes and associated display commands in separate files so that others with legal access to the media content can also experience the customized presentations by playback of the original media content (without the shortcomings of current methods requiring the illegal modified media content be sent too);
Separate indexes and associated semi-transparent display commands and/or layers in separate files that can be reused with associated content without changing the original media content;
Sharing of indexes and associated semi-transparent display commands and/or layers in separate files so that others with legal access to the media content can also experience the customized presentations by playback of the original media content (saving downloaded or stream file sizes and associated bandwidth, as well as saving users time).

The prior art we have researched contain no teachings of our new uses of users dynamically at run-time adding in their own or others annotations and advertisements as presentation only changes, without violating copyrights of the original creator and/or terms of use.

The prior art we have researched contain no teachings of our new uses of users dynamically at run-time adding in their own or others annotations and advertisements as presentation only changes for the embedding user or users to be compensated for views or sales.

The prior art we have researched contain no teachings of our new uses for user dynamically at run-time adding in defined Warping and Distortions to accommodate accessibility for the visually impaired (such as macular degeneration).

The prior art we have researched contain no teaching of our new use of separate us of IntelliMarks to control the rate, size, looping, etc. of Rapid Sequential Visual Presentation text, graphics or symbology. As background an expired USAF patent USAF patent number 4845645 titled Sequential Rapid Communication Visual Displays (a.k.a. RAP-COM for RAP-Communication) provided the scientific and prior art foundation for increased throughput, increased retention and more effective use of limited display areas, by rapidly sequencing textual and/or graphical aircraft instrument displays in the same display window space. Under the scientific terminology of Rapid Sequential Visual Presentation (RSVP) the reduction/elimination of eye-saccades in RAP-COM and similar displays has shown 3× to 4× increases in reading speeds (RSVP reference Reading in the Brain by Stanislas Dehanene printed by Viking Press (pages 17 and 18) ISBN 978-0-670-02110-9 Copyright 2009). Current small form factor communication and computer devices all suffer from small display areas and readability of text and graphics on said small displays requires moving the tiny displays closer to the user's eyes for viewing, and/or the use of reading glasses. Additionally small text and graphics are difficult to see, difficult to understand, slower to read, and more subject to glare detractions. Recent software based zoom selection and gesture innovations require extra manual steps to select text or graphics for software selected scale increases to the selected text or graphics to enable readability of such objects of user interest. Further these recent software techniques still suffer from less readable text to select from in the first place, requiring the user to cycle through the choices to read them, and even slower process. Additionally these recent software zoom innovations still suffer from reduced throughput and reduced reading speed associated with traditional reading which requires the user's eye saccades to occur for reading of text or viewing of graphics.

Previously, the inventor's Mirror Mimic Technologies (MMT) semi-transparent superimpositions have similarly demonstrated dramatic increases in throughput and comprehension also based upon by reduction/elimination of eye-saccades in the same way as Rapid Sequential Visual Presentation (RSVP). MMT also dramatically reduces the required display space for presenting information by semi-transparently superimposing in one location rather than simultaneously in several spatially disparate locations.

Previously, Above Real-Time Training (ARTT) by the inventors has demonstrated within simulators performance increases, increased throughput, and increased retention through ARTT research by the inventors in 100 plus publications and three national awards for ARTT research available upon request (or just Google ARTT). Additional time compression successes within simulators have been demonstrated by others. Similarly, time compressed commercial ads have also demonstrated increased throughput, and increased retention.

Typically, users manually adjust the angles and position of the display surface to their viewing eyes, and are limited by the default font size and orthogonal perspective, the prior art does not include bookmark controlled dynamically at run-time display commands to scale, warp, and/or distort the displayed information for the appearance from the user's eye-point of orthogonal perspective (a 45 degree tilted away display would have the physically farthest away shape scaled larger to make them appear to match the physically closer shape details.)

The prior art lacks convenient unobvious processes and devices to automate, dynamically adapt, and/or customize RSVP, MMT, and/or ARTT objects as advantageous constructs enabling higher communications throughput, higher human perception, cognition, and motor processor update rates, increased human task performance, increased human retention, reduced or eliminated eye-saccades, and more effective and efficient text and graphics displays that require less display space than conventional methods.

Previously, the prior art only teaches a specific user placing their own bookmarks within their own media player or reader, or restrictively shared within only their own web application account. Current methods of sharing of bookmarked items are typically done by sending the entire document or media file with the user's bookmarks embedded, or as a database entries contained within the reader software. The shortcomings include wasting bandwidth retransmitting the content and potentially additional data usage charges; wasting user's time waiting for downloads, plus potential copyright infringement problems with illegal modified copies, and/or violations of terms of use rights, with possible legal and financial penalties in either case.

The prior art of bookmarks teaches user being required to manually click on a bookmark to jump to a marked point which has been bookmarked by a user, with the drawback of jumping typically provides no continuity of the preceding content (unlike our invention which enables fast time playback WITH continuity); each manual jump requires a point and click or at least a key press or other command (voice, gesture, etc.) to proceed to jump to the next bookmark; prior art bookmarks do not act as media player automated commands or sequences of automated commands; prior art bookmarks have no concept or functionality associated with intervals to apply display commands to; and have no temporal or loop functionality at all.

The prior art lacks the teaching we have outlined for IntelliMarks' automation; lack separate bookmarks with associated command constructs; and lack compilations of bookmarks within separate files that enable sharing which are NOT embedded within the content, NOR within the media player itself; Current methods of embedding bookmarks frequently violate content copyright law and/or terms of use limitations (e.g., not allowing derivative works, not allowing any alterations, etc.).

The prior art lacks the teaching we have outlined for IntelliMarks' selective downloading of media content of interest from servers saving file size and bandwidth on media content that legally allows such partial uses, as well as saving user's time with quicker targeted downloads.

OBJECTS AND ADVANTAGES

Accordingly, several objects and advantages of the invention are:

IntelliMarks Concepts of Operation: —Human Computer Interface and Training enhancements where Human users or automations can add next generation bookmarks compiled within separate files that have the power of command scripting for media playback, such that the separate files are used in parallel and separately from the media player, and without altering the original media content illegally, and/or without embedding bookmarks within the media player complicating and increasing the size of the media player files or databases. As a working exemplar, the invention as object code executable software implemented in Microsoft's Windows .Net as a Windows Presentation Foundation application is included with this patent.

The IntelliMarks invention can be also be easily implemented within Web Browsers that support the HTML standards in general, and preferentially HTML5. Operation occurs with the separate IntelliMarks indexes with their associated display commands within their separate IntelliMarks file(s) being read by the Web Browser and dynamically at run-time used to alter the media content playback presentation by the Web Browser.

[The IntelliMarks invention separate constructs and parallel structure enables and empowers individual users to become media editors, directors, producers at the run-time presentation playing back content with a compatible Media Player (or internal Browser player); Similarly the Browser can combine the separate IntelliMarks and the separately streamed content such as a User sharing their IntelliMarks file for a YouTube video with a friend, who then plays back the specified YouTube video with the Browser adding the IntelliMarks changes during the replay.

The objects of real-time IntelliMarks additions along with providing advantages of a "what you see and hear is what you get" environment enables entirely new intuitive additions of the customization of user imagery advantageously, beyond conventional limited bookmark methods.

The objects of separate parallel live, streamed, or recorded IntelliMarks additions affecting videos, imagery, audio, rapid sequential visual presentation of text and/or graphics with commanded customizations including but not limited to:

Skip-from IntelliMarks <X> to IntelliMarks <Y> // Example use is to skip commercial ads or movie introductions or trailers;

Alter-Playback-Rate <Real-Time-Rate-Scalar> // Example use is to speed through boring parts, and slow-motion with best parts;

Freeze-Playback for <T> Duration (or Resume command) // Example use is to freeze on a good part;

Loop-from IntelliMarks <X> to IntelliMarks <Y> for <Z> Loops // Example use is to reinforce for learning;

Loop-from IntelliMarks <X> to IntelliMarks <Y> for <T> Duration // Example use is to reinforce for learning; [Implementations of loop should be done, so that the begin and end points are denoted, and then the UNALTERED content replayed, or WITH any existing IntelliMarks customizations in place that were in place at the BEGINNING of the loop, along with appropriate application of IntelliMarks as the occur within the looped segment. NO copy segmented is permitted by the invention such copying would be a potential copyright infringement.]

Zoom-from IntelliMarks <X> (Optional Off-Set-The-Center-of-the-Zoomed-Area) // Example use is to zoom in on an object of interest;

Alter-Attribute-or-Property-from IntelliMarks <X> (Optional parameters that are needed to set or modify the targeted attribute or property such as font color, font size, video resolution, video playback update rate, etc.) // Example use would be to change the font color, font size and type to bold for the inventors Hyper-Time (a.k.a. RAPCOM++) invention which uses rapid sequential visual presentation for playback of text;

iAnnotate-from IntelliMarks <X> (option to IntelliMarks <Y>; or duration <T>) with text (overloaded function also includes audio file, video file, audio/video file, object, and/or special effect, and/or UGhost; // Example use is to intuitively add a user's comments to the saved or shared experience;

iAnnotate-UGhost-from IntelliMarks (option to IntelliMarks <Y>; or duration <T>) with the inventors semi-transparent superimposed facial and body language WITHIN the content; // Example use is to enable users to UGhost themselves into live streaming, or prerecorded content Restore-Defaults-from IntelliMarks <X> // Example use is to reset all the prior commanded changes back to the media player or readers defaults (option to the user's preference file).

Objects of IntelliMarks can be enumerated with numbers, or text which includes meta-information such as the user's name, date, time, reason, and notes as text, audio, and/or video. This enables advantages of modularly added on to media player software to just play a selected user's IntelliMarks, or selected groups of users' IntelliMarks. Specifically IntelliMarks advantages also include being used as "tags" for web semantic search and/or sort purposes.

The objects of separate parallel live or recorded IntelliMarks additions adding associated users' video, and/or audio, and/or UGhost annotations, and/or rapid sequential visual presentation of text and/or graphics (in addition to with commanded customizations) along with synchronization features, enabling use with copyrighted materials without infringing on copyright law (no derivative works, etc.).

The objects of IntelliMarks being implemented by generating a separate date/time-stamp file index or file pointer or stream pointer, or a separate file index/position or file size pointer, providing the advantages of additions or annotations affecting videos, imagery, audio, rapid sequential visual presentation of text and/or graphics with commanded customizations.

This IntelliMarks invention generally provide new unobvious separate parallel "special" bookmarking and associated intelligent commands objects providing advantages of dynamic at run-time altering the PRESENTATION of video, rapid sequential visual presentation (RSVP) of text, graphics, symbology, etc.; and/or PowerPoint presentation and/or any sequenced media or content. IntelliMarks separate parallel "special" bookmarking as indexes with associated intelligent commands inclusive of synchronization points, and/or single or sequences of commands as innovatively completely separate from the content it manipulates the presentation of; providing key advantages and benefits not taught in the prior art.

IntelliMarks Video Example: A User can IntelliMark use clicking on an IntelliMark Icon (or button) to generate an IntelliMark index (file pointer index, or timed index) that inserts a visual bookmark indicator or icon overlaid onto the video slider bar, and provides a pop-up menu for the user to select from a default jump to bookmark, or add commands such as increase rate of playback to 1.5×, slow-down rate of playback to 0.5, reset all changes to the default, zoom in, begin-loop, end-loop-repeat-3-times, repeat loop for x time, insert playback of another media content file here and when finished resume media playback, etc. A User can speed through the boring parts with continuity (frequency shifting the audio to compensate is the preferred embodiment); slow down through the "best part", zoom in on the area of interest, and/or loop to repeat an important instructional point. The unobvious object is the user can then share just the IntelliMarks file without illegally sharing or illegally copying the original content! To get even more specific with our video example, If User#1 IntelliMarks a favorite YouTube Video, and then send the IntelliMarks file to his friend User#2 along with a link to said favorite YouTube Video, then User#2, gets to playback the video presented as User#1 customized it. To speed through the boring part, slow down the Kung Fu battle scene, and zoom in on the great kick that Master Chi uses to win the battle, etc.

Another unobvious object and advantage of the IntelliMarks invention is User#1 being able to mark the commercial advertisements, etc. for skipping entirely so that User#2, to User#1,000,000,000 do not have to watch the commercials, they just use the IntelliMarks file to alter the dynamic run-time presentation so as to not view the commercials which are still embedded within the legally protected copyrighted media content materials.

Another unobvious object and advantage of our IntelliMarks invention is to insert commercial advertisements dynamically at run-time into media playback such that User#1 adds the commercials where he wants to, selecting the commercial and including within the IntelliMark a method that credits User#1 every-time the commercial is viewed and/or credit anytime a hyperlink or other link within the ad is used by other users.

Another unobvious object and advantage of our IntelliMarks invention is to add semi-transparent superimposed graphics, annotations, video sequences etc. as a separate layer synchronized with but not impinging upon the original content. Example: During a video of a cool fight scene, User#1 uses the inventor's Mirror Mimic Technologies or UGhost product to semi-transparently display themselves into the fight scene content so that all subsequent users that view the same video PRESENTED using User#1's associated IntelliMarks, will see User#1 as a semi-transparent superimposed UGhost finger pointing out items of interest and talking about them during the video playback further enhancing human to human communications with their facial expressions and body language being visible.

Another unobvious object and advantage of our IntelliMarks invention are single command editing while viewing the content real-time enables users to naturally multimodal interact with editing the viewer presentation of the content. Implementations include a mouse click with a pop-up menu of commands, voice recognition commands, and/or gestures recognition through Kinect, Leap Motion, or other devices. One popular method is to mouse click on the progress bar of the video being played and then voice commanding the changes to playback rate, loop, zoom, etc.

Objects of our invention enable advantages of our IntelliMarks separate files or command streams to control the presentation to the viewer of synchronized replay of a semi-transparent user video as "ghost" imagery superimposed over ANY content (e.g., Web pages, PowerPoints, Documents, Videos, etc.). The user's ghost video can naturally point to objects of interest within the underlying content, including audio of their speech as they point and tell. Key advantages are the large size of the user's face provides the many non-verbal cues of facial expression far superior to current small picture-in-a-picture (PiP) sub-window methods. Further the inclusion of their speech audio includes the intensity, inflections, tones, and rate changes so important to human communication. The key innovation are by keeping the semi-transparent video, audio, and indexes in a separate file, they can be superimposed onto ANY content WITHOUT violating any copyrights of the underlying content. The underlying content is NOT changed, and NOT copied in any way. A great example is an expert teaching someone how to use a web site. Ideally, the expert has a touch sensitive display or the new Kinect interface can also be used with its built-in camera. The simplest way is to use the mouse with one hand to actually trigger the controls and point with the other hand and finger. Any of these simple methods has the net effect and appearance as the expert activates controls on the web site by touching controls you can see the expert as a ghost looking out at you the student from apparently inside the display screen.

Objects of our invention enable advantages of our IntelliMarks separate files or command streams to control the presentation to the viewer of multiple ghost layers to be added by the users, and/or groups of users. The invention enables color tinting of the layers to enable convenient differentiations of the multiple layers. The opacity of each level is also controllable with a default that is set by the original user(s), but changeable to the preferences of the viewing users.

Objects of our invention enable advantages of our IntelliMarks separate files or command streams to recursively control the presentation to the viewer of software or hardware players of content to accept the separate IntelliMark indexes and their embedded bookmarks, synchronization points, and/or commands to alter the presentation of the content WITHOUT changing the content, WITHOUT copying the content in any way, and WITHOUT infringing any copyrights. Examples—include a user providing a separate file of IntelliMarks along with a link to a YouTube Video. In our Windows based implementation we use the Microsoft Media Player where the IntelliMarks enables jumping into the YouTube Video content at the specified bookmark locations. Further, we have implemented associated commands for slowing the rate of presentation for the interesting parts, speeding up the rate of presentation to speed through the boring parts while maintaining context (we also support automated frequency shifting of the audio to mitigate the "Mickey Mouse effects of higher speed playbacks), we also support looping to reiterate points of importance, and zooming of the content to focus on objects of interest. One trigger sequential combinations are also objects of our invention which provide the advantages of the user modifying the presentation of the video at one point and then speaking or gesturing in a slow rate and zoom in that will manifest as both happening simultaneously to the subsequent viewers. That is one IntelliMark can have one, two, many, and/or a plurality of commands associated with it to affect the presentation.

Objects of our invention enable advantages of our IntelliMarks separate files or command streams to control the presentation to the viewer of:

Objects of Rapid Advanced Communication Environment's Rapid Sequential Visual Presentation (RSVP) automations by resizing the text or graphics along with altering the font, style, and/or other characteristics, based upon presets, and/or user preference settings, and/or automated user facial detection for distance and/or viewing angle from the display providing multiple classes and types of advantages including but not limited to enabling users: —

- To easily read their smart phone displays conveniently WITHOUT fumbling with their reading glasses; Exemplar: Verizon Smart Phone user selects to use our ZACE invention which has already stored his preferences for RSVP viewing for specific Smart Phones display (resolution, update rate, contrast settings, intensity, gamma, etc.), font size 50, Arial, Bold, with a 60 ms display of each word, along with auto blink detection and delay feature option selected to "on", where the RSVP automatically pauses during eye-blinks detected by the smart phones forward facing built-in camera. Our user bring up his normal texting, or email interface and by selecting to view has elected to view the RSVP communication within a window associated with the texting or emailing persons message.
- To easily and conveniently read and understand displays of all types being especially useful and beneficial for small form factor and limited resolution displays;
- Drastically reduce the screen display space required versus typical conventional multiple simultaneous displays of information;
- To increase reading or visualization understanding speeds up to 3× or 4× of normal English reading speeds;
- Provide support for users' spatial and temporal preferences.

IntelliMarks of RSVP objects that are automations and new non-obvious combinations and extensions methods based upon the scientific foundation of rapid sequential visual presentation (RSVP), identification and comprehension remains satisfactory. (RSVP reference Reading in the Brain by Stanislas Dehanene printed by Viking Press (pages 17 and 18) ISBN 978-0-670-02110-9 Copyright 2009) and RAP-COM (Expired Patent described in the prior art section) providing advantages to increase to staggering reading speeds of eleven hundred words per minute, and up to sixteen hundred words per minute for the best readers. Which is, approximately one word every forty milliseconds and three to four times faster than normal reading!

IntelliMarks of RSVP Objects to auto-size text and/or graphics as time sequence displays that reduce or eliminate the need for eye saccades on TVs, computer monitors, smart phones, etc., based upon automated facial detection and sizing algorithms to default physics driven standards, and/or visual perceptual standards, and/or as modified by user preferences providing advantages in easy of viewing.

IntelliMarks of Mirror Mimic Technologies (MMT) Objects to automatically select the semi-transparency (or opacity) of windows, text, or graphics including but not limited to alpha channel blends, color tints, intensity, glass effects, other textures, etc. A typical advantage is semi-transparency such that an expert's video imagery can be used as an intuitive guide which a user can mimic WITHIN with their own "user ghost imagery" superimposed via a web camera or other means. Multiple object configurations and advantages are supported including (1) the default configuration is an expert layer being opaque and the user layer semi-transparent (so that existing content can be used directly such as YouTube sources); (2) configuration where the expert layer is semi-transparent and the user layer is opaque enables the user to stay within the expert's "ghost guide"; both expert and user layers can be semi-transparent and superimposed to the users preferences; when both expert and user layers are both semi-transparent and tinted different colors and a third opaque layer of yet another different color enables blended tints that are intuitive to see when the user is correctly mimicking the expert, as well as dramatic color changes when the user exceeds the boundaries of the expert's imagery. Other objects include mirror flipping to compensate for right/left reversals to aid users having a more intuitive experience and/or to compensate for switching for left or right handedness differences between the expert and user; Another object and advantage of the invention goes beyond playback of prerecorded content to also support live/live interactions where the expert in real-time sees themselves superimposed with the user, and the user sees themselves superimposed with the expert each on their own displays (i.e., an enhancement to conventional telepresence. Another object and advantage is the output of the combined ghosts to a video file for later analysis and viewing.

IntelliMarks of Above Real-Time Technology Objects to automatically select the rate of simulated time flow within games, simulations, or other applications, as well as alter the operating system parameters to their preferences for interaction speed, etc. An object and advantage is rather than one user profile for all platforms, the ZACE construct enables the user to select his temporal playback and interaction rates based also on environment and platform. For example, a 15 minute train ride, our user can run the prerecorded 30 minute TV series program at 1.5× above real-time, and speed view the entire TV program within his 15 minute train ride (includes commercial ad skipping which is typically 10 minutes of a 30 minute TV program in America). Below real-time to slow motion view items. Another object and advantage is above real-time listening to music, or recorded conversations.

IntelliMarks of RSVP, and Above Real-Time Technologies (ARTT) new use unobvious combinations where the video is played at above real-time and the close caption text is synchronized played back with RSVP to enable above time viewing at rates higher than audio can support intelligible (audio suffers from too much compression "Mickey Mouse effect" at too high speeds).

IntelliMarks of RSVP, Mirror Mimic Technologies (MMT), and/or Above Real-Time Technologies (ARTT) Objects to automatically perceptively skew and/or digital warp and/or distortion correction for a facial detection angle and distance providing advantages such that the image is displayed orthogonally to the user. For example, the user views the display from 45 degrees to the left of the normal vector from the display surface, the text will be unevenly scaled so that the letters/spaces nearer the user are smaller than further letters/spaces in such a manner as to appear from the users view to be the same size and evenly spaced as if the display was actually straight on to the user, and/or user(s) preferences.

IntelliMarks of RSVP, MMT, and/or ARTT Objects to affectively sense the emotional and attentional state of the user(s) and automatically adjust size, speed, and/or perspective orthogonal display of text or graphics to provide advantages in optimizing user(s) perception(s) and/or understanding, and/or user(s) preferences.

IntelliMarks of RSVP, MMT, and/or ARTT Objects of smaller display area and sequential display of information over time spans providing advantages of increased privacy and security. For example: Rather than on "over the user's shoulder" sneaky information thief being able to see the entire screen and/or sneak a photograph of the screen, our invention only shows a small portion of the information at any one time. Information thieves will have linger much longer or focus video capture devices in obvious ways which will increase the likelihood of thieves' detection.

IntelliMarks of MMT Semi-Transparent "WaterMarks" used with RSVP, ARTT and even conventional displays methods objects with advantages of making it more difficult for others to view the users display except from the user's eye-point. Other objects and advantages are to use color tinting and knowledge of the human visual perceptual system to increase the effectiveness of the users display privacy.

IntelliMarks of RSVP where users typing of documents include an RSVP type entry window object for one word at a time thus reducing or eliminating eye-saccades enabling innovative unobvious advantages of faster, more accurate, less stressful, and/or more secure communications (again spies only see one word at a time).

IntelliMarks of RSVP augmented Comics or Videos where the talking bubble displays the text in RSVP format, enabling faster comprehension and more effective use of comics display spaces.

IntelliMarks of RSVP and/or ARTT objects with the advantages being that audio/video content, or computer content with Close Caption Text is displayed in RSVP format, along with the synchronized Video being displayed with ARTT enabling faster communication than human speech can support. Converse objects and advantages include slower than real-time so that users can see the lip movements during speech rehab or foreign language learning that go with the words. Further by semi-transparent superimposition we can add text over top of the lips or very close to the lips reducing eye-saccades for faster understanding, etc.

IntelliMarks of RSVP, MMT, and/or ARTT Annotated Videos and Avatars objects with advantages similar to the Comics advantages and the close caption video advantages. For example, a 3D Avatar in second life can have the text talking bubble presented in RSVP format.

IntelliMarks of RSVP, MMT, and/or ARTT Annotated FlashCards objects with the advantages of semi-transparent superimposed via MMT, text presented in RSVP format, and the entire FlashCard sequence presented in a special version of ARTT (Learning Languages, multiplication tables, etc.).

IntelliMarks objects embodiments go beyond recorded and/or live video based imagery, to also include recorded and/or live virtual reality and augmented reality 3D Avatars including advantages of MMT with 3D Avatars driven from a $150 Microsoft Kinect module or $80 Leap Motion module. Additional embodiments' objects also include where the 3D Avatars are valid content and covered in our claims for our semi-transparent superimposition innovations including advantages but not limited to:

IntelliMarks objects embodiments inclusive of a Kinect or Leap Motion module (or any other motion capture system) driven 3D Avatar driven enables the user/student/patient to view the expert's semi-transparent superimposed "ghost guide" from ANY angle, distance, perspective! Our basic video based solution restricts the user/student/patient positioning to the same angle, distance, perspective as the original expert's video camera (with some auto calibration scaling support, but it is not as good as complete 3D control over the Avatar). Please keep in mind the 3D Avatar can be opaque with the user being the ghost superimposed or both the 3D Avatar and the user can be semi-transparent superimposed, etc.

IntelliMarks objects embodiments where the Avatar can be auto scaled to fit the user, and/or actually drive an actual 3D Avatar version of the user/student/patient for a perfect fit (or slight over-scale so that you can see the edges of the guide). This is an improvement over our current process of enabling scaling of the video or live camera 2D views.

IntelliMarks objects embodiments where both the expert and the user are Avatars which enables users to practice without being self-conscious or ashamed of their being overweight, or disfigured (amputees, etc.).

IntelliMarks objects embodiments where multiple synchronized copies of the 3D Avatar are simultaneously for additional references. Exemplar: Quad windows showing the 2.5 D projection like a CAD program in the upper left and the other three windows showing front, side, and top views.

IntelliMarks objects embodiments with 2 or more people dancing or practicing martial arts together (this works well with the video based version of MMT already) the Avatar version has the advantages of #2 and #3 above.

IntelliMarks objects embodiments where the 3D Avatars (experts and users all have Avatars) is 3D displayed with the new 3D HDTV technologies for holo-desk like new uses.

IntelliMarks objects embodiments for perception enhancements providing advantages in the areas overcoming visual perceptive deficiencies are enabled by additional embodiments. For example, RSVP display with user customized font size and warping/distortion along with spacing to compensate for macular degeneration. The science is to exploit Human reading invariants in size and angles to map the textual and graphical display around the perceptual problem. A simple case to overcome central macular degeneration is RSVP of one word at time with the letters large enough to use the low resolution portions of the eye and aligned along a curve that avoids the degeneration central area of the eye (normally the high resolution area). Within our drawings the display labeled 1000 has a defined RSVP window area that does not have to be square that defines the viewing extends for the user preferences for any given display 1010 such that the user does not need to make any eye movements (saccades) to see the entire RSVP window area. The actual RSVP text labeled 1020 is sized and bolded to work well with the low resolution portions of the eye, as well as arched (using Microsoft's Word Art feature) to avoid display in the degenerated region 1040. The object is customized display of RSVP text and graphics to avoid the degenerated perception region and compensates for the lower resolution portions of the eye shown in the diagram.

Additional advanced objects and advantages are apparent from actual use of the executable software included with this patent.

Further objects and advantages will become apparent from a consideration of the ensuing description and drawings.

SUMMARY

In accordance with the invention, IntelliMarks processes and devices enable innovative enhancement of Human Interactions, Sharing, and Collaboration including improving Human-Computer Interfaces and Training, specifically to providing objects of separate parallel intelligent bookmarks (IntelliMarks) which include scripted display commands or sequences of commands for live, streamed, or recorded dynamic run-time additions/changes affecting videos, imagery, audio, rapid sequential visual presentation of text and/or graphics with commanded customizations.

Also in accordance with our IntelliMarks invention, users can conveniently customize their Subsequent Playback or Live Presentation of Content preferences for Video, Rapid Sequential Visual Presentation (RSVP), Mirror Mimic Technologies (MMT), and/or Above Real-Time Technologies (ARTT), video teleconference, (Skype, Polycom, LifeSize, Cisco, etc.) as software constructs and methods that automatically configure and control human-machine-interfaces (HMI) and human-computer-interfaces (HCI). Exemplar: A smart-phone user purchases our IntelliMarks invention as an App from the Amazon AppStore. The user can then playback a YouTube video and use the IntelliMarks App to create his own customizations to the presentation rate, zoom, looping, etc., and then share the IntelliMarks file along with the YouTube video link, so that others can experience the YouTube video as he edited the presentation of (without altering the underlying content violating any copyright or terms of use conditions). Similarly by combined use with the Inventors Mirror Mimic Technology Invention a User can add temporal sequencing defaults as presets; along with semi-transparency settings; and/or temporal manipulations of rates of audio playback, video display playback; game play interactions, operating system interactions. IntelliMarks users are able to conveniently view their text or video annotations or advertisements presented with the content.

Similarly, an IntelliMarks user can log into a virtual reality on-line world or on-line game where recorded interactions can be replayed through the editing of the presentation of the IntelliMarks. This is very valuable in learning contexts for military users during after action review where IntelliMarks enables each simulation participant to rapidly markup the after-action-review video or DIS/HLA log file playback with his text, speech, and/or video annotations, jump to the points of interest, speed through the non-relevant parts while maintaining continuity, and slow motion loop over critical learning events (such as an accident simulation fratricide towards determining what went wrong and how to save lives in the future (simulated lives and real lives). For live video teleconferencing, IntelliMarks enable real-time adding of annotations for later replay of the recording, or sports type instant replay features to aid in understanding, and avoiding confusion. A simple use is the loop to rehear a statement unheard due to local noise.

IntelliMarks combined with existing media and telecommunications devices modularly added on can provide entirely new levels and types of Human Computer interaction where spatial and temporal and semi-transparency innovations are combined to provide new levels of presentation dynamic run-time customization without violating copyright, and empowering the viewer to alter to his preferences rather than being locked in by the originating user or current video editing tools'. IntelliMarks increasing users' throughput, increases usability, saves display screen space and users' time, and increasing users' effectiveness, and/or learning, and/or understandability and retention of communications.

BRIEF DESCRIPTION OF THE DRAWINGS

FIG. 1 is a Flow Chart Diagram of IntelliMarks being created by the user and stored into a separate XML file to be used with copyrighted media content that is illegal to copy or modify.

FIG. 3 are example HyperTime application with use of the IntelliMarks XML file that illustrates one embodiment where the dynamic content and commands are collected into a separate file for the users own use, or sharing with others.

FIG. 4 is a Flow Chart Diagram of IntelliMarks being automatically interpreted and executed from a separate XML file, dynamically at run-time altering the presentation of the media content without copying or modifying the underlying copyrighted media content that is illegal to copy or modify.

FIG. 5 is a Flow Chart Diagram of IntelliMarks being created by the user and stored into a separate XML file that are indexes into separate files that are legally allowed to be partially copied and/or modified.

FIG. 6 is a Flow Chart Diagram of IntelliMarks being automatically interpreted and executed from a separate XML file that are indexes into separate files that are legally allowed to be partially copied and/or modified.

FIG. 7 is an example of an IntelliMarks altered RSVP display with user customized font size and warping/distortion along with spacing to compensate for macular degeneration.

FIG. 8 is a screen capture of IntelliMarks modularly implemented within the inventors Mirror Mimic Technology invention as a software implementation using Microsoft's Windows Presentation Foundation running on the .Net Operating System.

DETAILED DESCRIPTION & OPERATION

Preferred Embodiment—FIGS. 1-6

Figure 2A:
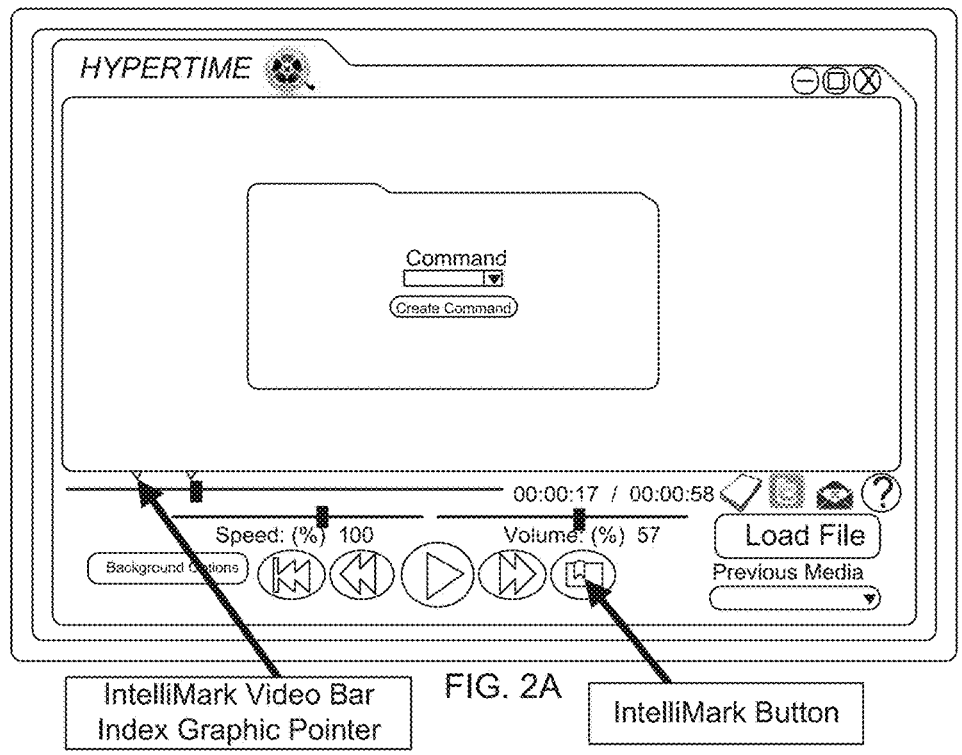
FIGS. 2A and 2B are Screen Captures of IntelliMarks displaying text enabling faster reading as a working example of the object executable software included on this patent applications CD running on a PC window environment a smart phone emulation (for Win 7 Phone).
Figure 2B:
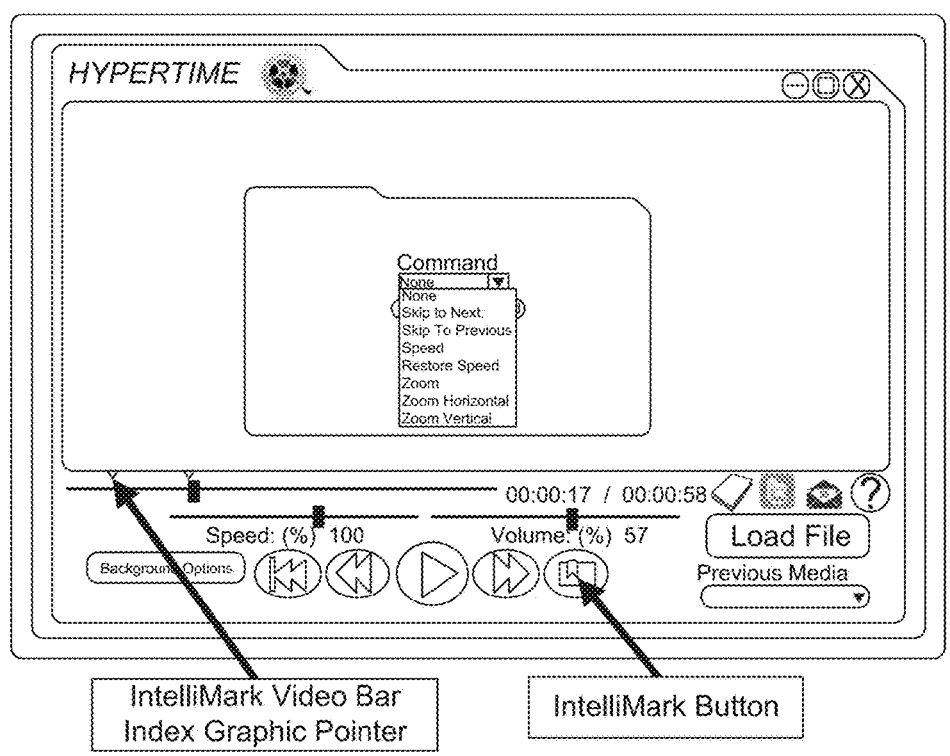

FIG. 1 is a Flow Chart Diagram of IntelliMarks being added to a Video 'X' that resides on the user's disc that is copyrighted so that the original media content cannot be legally copied or modified. FIG. 1 shows the Flow Chart Diagram of IntelliMarks where Block #10 starts within the HyperTime application (or other Media player, or a HTML compliant web browser, enabling IntelliMarks being created by the user and stored into a separate XML file to be used with copyrighted media content that is illegal to copy or modify; and passes control to Block #20;

Block #20 loads the Users desired video named 'X'.wmv and enables the User to auto-complete generate the file name that is open (or alter the name) to enable the IntelliMarks file header to contain the associated file name, that will also contain the IntelliMark indexes and their associated commands to work with but separately from the 'X'.wmv video content. Control then passes to block #30;

Block #30 Enables the user to select the points within the video content being displayed (and/or Documents, Instant Messages, Email, Texting, Comics, etc.) where the IntelliMark is to be inserted (or an existing IntelliMark altered, or deleted) that is added to the IntelliMarks file as an index or pointer (file size index or time index), along with raising the pop-up context menu to the inserted IntelliMark graphic icon added onto the video slider bar, such that the user can just click again to select the default of the "jump to" command, or move their mouse (or other controller) to select another command to insert. Loop commands require both a begin loop and end loop commands are not shown. Control then passes to Block #40;

Block #40 Is a select decision process which if the user selects a command the index and the selected command are inserted within the IntelliMarks file and control passes to Block #50, else if the default is selected control passes to Block #70;

Block #50 is an output process that inserts the index's size or timed indexed location with the user selected command associated, with control passing to Block #60;

Block #70 Just inserts the index and the default Jump-To file size or timed location with the Jump-To type command associated, with control passing to Block #60;

Block #60 Continues the Playing Video and passes control back to the Viewing User in Block #30;

FIGS. 2A and 2B are Screen Captures of IntelliMarks displaying the commands to select from our HyperTime application invention. More specifically, FIGS. 2A and 2B are Screen Captures of IntelliMarks displaying the commands to select from a HyperTime application via the icon associated pop-up context menu. The screen in FIG. 2A illustrates a default "jump to" index which when automatically interpreted and executed enables skipping commercial advertisements or boring content, etc. The screen in FIG. 2B illustrates selected commands that can be added with IntelliMarks by typical users.

FIG. 3 is an example IntelliMarks file that illustrates one embodiment where the indexes and commands are collected into a separate XML file or files. The video name and locations are encapsulated along with indexes and commands are collected into a convenient sharable format (XML) file. Sharable XML files are a preferred format, however practitioners aware of the state-of-the-art can select any format they prefer such as excel spreadsheet, database look-ups, comma delimited files, etc., for use with embodiments disclosed herein.

FIG. 4 is a Flow Chart Diagram of IntelliMarks being automatically interpreted and executed from a separate XML file, dynamically at run-time altering the presentation of the media content without copying or modifying the underlying copyrighted media content that is illegal to copy or modify.

Block #410 starts within the HyperTime application (or other Media player, or a HTML compliant web browser, enabling IntelliMarks being created by the user and stored into a separate XML file to be used with copyrighted media content that is legal to copy, or partially use, or modify; and passes control to Block #420;

Block #420 loads the Users desired video named 'X'.wmv and a Video 'X' associated IntelliMarks separate file into the Hyper-Time Application for playback, and the User Selects the Play Button and the Media Content video is played back. Control then passes to block #430;

Block #430 Within the Hyper-Time application as each video playback time equals or exceeds the IntelliMarks time indexes within the XML listing, the associated dynamic at run-time display commands are read in and queued for executed. Control then passes to Block #440;

Block #440 is a select decision process which sorts the commands with special handling for interval commands such as loop. If it is a special interval command then control passes to Block #470; else control passes to Block #450;

Block #450 is an dynamic run-time output process that inserts the index's size or timed indexed location with the user selected command associated, with control passing to Block #460;

Block #470 Just inserts the interval indexes and at the associated timed location and executes the interval command(s) associated, with control passing to Block #460;

Block #460 Continues the Playing Video and passes control back to the Viewing User in Block #430;

FIG. 5 is a Flow Chart Diagram of IntelliMarks being created by the user and stored into a separate XML file that are indexes into separate files that are legally allowed to be partially copied and/or modified. The creation of the IntelliMarks is the same process as illustrated in FIG. 1, however the automated interpretation and execution as shown in the following FIG. 6 is different where advantageous to the user. As illustrated in FIG. 5, Block #510 starts within the HyperTime application (or other Media player, or a HTML compliant web browser, enabling IntelliMarks being created by the user and stored into a separate XML file to be used with copyrighted media content that is illegal to copy or modify; and passes control to Block #520.

Block #520 User's Loads Video 'X' into the Hyper-Time Application for playback, and the first click of the IntelliMarks Icon opens a file name box with the default auto-complete filename being 'X' to associate the IntelliMarks file to the video the user is using. User accepts the file name or alters it, User Selects the Play Button and the Media Content video is played back, Control then passes to block #530;

Block #530 Enables the user to select the points within the video content being displayed (and/or Documents, Instant Messages, Email, Texting, Comics, etc.,) where the IntelliMark is to be inserted (or an existing IntelliMark altered, or deleted) that is added to the IntelliMarks file as an index or pointer (file size index or time index), along with raising the pop-up context menu to the inserted IntelliMark graphic icon added onto the video slider bar, such that the user can just click again to select the default of the "jump to" command, or move their mouse (or other controller) to select another command to insert. Loop commands require both a begin loop and end loop commands are not shown. Control then passes to Block #540;

Block #540 Is a select decision process which if the user selects a command the index and the selected command are inserted within the IntelliMarks file and control passes to Block #550, else if the default interval download options are selected control passes to Block #570;

Block #550 is an output process that inserts the index's size or timed indexed location with the user selected command associated, with control passing to Block #560;

Block #570 Just inserts the interval indexes for associated IntelliMarks Command(s) such as only loading the desired interval(s) from the server file or server files with control passing to Block #560;

Block #560 Continues the Playing Video and passes control back to the Viewing User in Block #530;

FIG. 6 is a Flow Chart Diagram of IntelliMarks being automatically interpreted and executed from a separate XML file that are indexes into separate files that are legally allowed to be partially copied and/or modified.

Block #610 starts within the HyperTime application (or other Media player, or a HTML compliant web browser, enabling IntelliMarks being created by the user and stored into a separate XML file to be used with copyrighted media content that is legal to copy, or partially use, or modify; and passes control to Block #620;

Block #620 loads the Users desired video named 'X'.wmv and a Video 'X' associated IntelliMarks separate file into the Hyper-Time Application for playback, and the User Selects the Play Button and the Media Content video is played back. Control then passes to block #630;

Block #630 Within the Hyper-Time application as each video playback time equals or exceeds the IntelliMarks time indexes within the XML listing, the associated dynamic at run-time display commands are read in and queued for executed. Control then passes to Block #640;

Block #640 is a select decision process which sorts the commands with special handling for interval commands such as loop. If it is a special interval command then control passes to Block #670; else control passes to Block #650;

Block #650 is an dynamic run-time output process that inserts the index's size or timed indexed location with the user selected command associated, with control passing to Block #660;

Block #670 just inserts the interval indexes and at the associated timed location and executes the interval command(s) associated. These interval commands include not downloading media content streams intervals that are not of interest saving file size, saving bandwidth, and saving user's valuable time; this block also enable mash-ups from multiple files with user selected intervals being sequenced or fused with IntelliMark commands, control passing to Block #660;

Block #660 Continues the Playing Video and passes control back to the Viewing User in Block #630 or optionally back to FIG. 1 enabling the user to insert, edit, move, or delete existing or new Intellimarks;

FIG. 7 is an example of an IntelliMarks altered RSVP display with user customized font size and warping/distortion along with spacing to compensate for macular degeneration. The science is to exploit Human reading invariants in size and angles to map the textual and graphical display around the perceptual problem. A simple case to overcome central macular degeneration is RSVP of one word at time with the letters large enough to use the low resolution portions of the eye and aligned along a curve that avoids the degeneration central area of the eye (normally the high resolution area).

FIG. 8 is a Screen Capture of IntelliMarks displaying the commands to select from within our Mirror Mimic Training application invention. As illustrated, such commands may include, but are not limited to, skip to next, skit to previous, speed, restore speed, zoom, zoom horizontal, zoom vertical, etc.

Description & Operation—Alternative Embodiments

IntelliMarks Presentation manipulations to 3D HDTV displays and other emerging 3D displays can be spatially and temporally controlled with the additional advantages of additional layer visualizations, full virtual rotations of objects of interest, and fusions of multiple recordings and/or streams.

IntelliMarks Presentation manipulations to HMD displays and other emerging virtual/augmented/mixed reality displays with 2D, 2.5D and 3D display also affected by the commanded changes to update rates, display resolutions, pixel color depths, display screen layouts, scaling, warping and/or distortion spatially or temporally. Such as viewing user temporal manipulations to achieve Above Real-Time Training (ARTT) [100 plus ARTT research articles published by inventors.]

IntelliMarks Presentation manipulations implemented through Brain Computer Interfaces, speech recognition, touch screens, Touch&Speak, Gesture Recognition, Eye-Tracking, single Kinect modules, multiple Kinects, Leap Motion module(s), or other motion capture devices, and any combinations of inputs for automated control of media content, also including RSVP, ARTT, and MMT.

IntelliMarks Presentation manipulations and fusion to implement advanced computer displayed flash cards for language skills which each RSVP displayed word is superimposed semi-transparently over an image of the object; along with simultaneous synchronized audio. The advantages again include higher through put and retention through elimination of eye movements (saccades) for viewing the words, associated image, along with hearing the verbalization.

IntelliMarks Presentation manipulations to implement automated feature or object detection processes including GPU or APU accelerated detection of edge differences, etc. Exemplars: Face and Eyes detection, smile detection, sniper scope detection processes IntelliMark added to video or sensor data streams.

IntelliMarks Presentation manipulations to enable user preferences or automated color difference combination by virtue of tinting different objects of interest different colors, and/or automated by environmental sampling. Exemplars: Red tinted thick lined circles surrounding found sniper optics, IntelliMarks automatically added in by automated feature or object detection processes including tinting and semi-transparent graphics and/or other methods of highlighting detected features or objects of interest. Exemplars: The sniper optics detection process actually generates sniper warning graphics into the video and sensor imagery streams, including an audio alert as fully automated processes. Similarly any alarm or detection device can add in IntelliMarks to highlight the information of interest. Training applications including Instructor Operators of simulation adding IntelliMarks for After Action Review purposes, including verbal or video annotations and notes as reminders as to details or why they added the IntelliMark.

CONCLUSION, RAMIFICATIONS, AND SCOPE

Thus the reader will see that the IntelliMarks capacities of the invention to more effectively enable dynamic at run-time customizations of media presentations without altering the original content, without violating copyrights, and without violating terms of use.

While the above description contains many specificities, these should not be construed as limitations on the scope of the invention, but as exemplifications of the presently preferred embodiments thereof. Many other ramifications and variations are possible within the teachings of the invention. For example, counter to prior art teaching and current practices such as Amazon's Ad-Sense where a central provider has each vendor bid towards having key words as search terms advantageously linked to their products or services; IntelliMarks enables an entirely new distributed "crowd source" direct business model where individuals insert mini-ads within crowd source media (e.g., free YouTube Videos, Flickr, FaceBook postings, Web Sites, etc.) with direct vendor agreements that provide rewards to the inserting user based upon other viewing and or purchasing from individual's mini-ads. IntelliMarks in addition to enabling a user to command presentation changes also enables the user to add special hyperlinks which uniquely identify the user and the vendor approved ad so that rewards can be routed to the right individuals or groups.

Also counter to prior art teaching and current practices such as an advertising company for a cost creating commercial ads for vendors, and then for further costs designing a media campaign and buying media time and/or space for said advertising business model; IntelliMarks enables vendors to offer rewards to ANYONE that creates favorable commercial ads with a vendor approval step added to ensure non-controversial mini-ad content acceptable to the vendor, or a mini-ad template provided by the vendor where minor changes can be made like the user's face inserted (and still approved by the vendor before receiving the reward link)

IntelliMarks enable the User's Mini-Ads to be added to present within a media playback sequence or simultaneously semi-transparently superimposed while the content continues to playback.

IntelliMarks enable the User's to insert Skip-Begin and Skip-End pointers to enable subsequent users that view the associated video with the IntelliMarks driving the media player to skip commercial ads or other uninteresting part of the video. Or alternatively, to substitute in their own advertisements for the ads that were skipped.

IntelliMarks can be used to add semi-transparent superimposed videos, or animations, or graphics onto other content. For example: IntellMark-Start-Video <video name'X' or URL'X'> followed by another IntellMark-Start-Video <video name'Y' or URL'Y'> with the top video's opacity set to 60% or user desired level.

IntelliMarks used with the inventors' Mirror Mimic providing Invisible Z-Depth Encoded Hit Plates with holes which enable virtual objects to appear to penetrate into holes. The Invisible Z-Depth Encoded Hit Plates are added to existing imagery content (stills, video, virtual reality) and the user imagery can then be used to appear to penetrate the existing imagery. For example, a semi-transparent user superimposed over top of a video with IntelliMarks that animate the Invisible Z-Depth Encoded Hit Plates onto an actor within the video can have the user's finger to appear to go into the video actor's nose and mouth as part of a comedy addition.

IntelliMarks enable ANY User to customize the presentation where the boring parts are viewed at higher playback rates, the most interesting fight scene is viewed in slow motion with the most interesting parts zoomed in on, and/or the fight scene looped repeatedly with different zoom ins emphasizing different key parts of the fight sequence.

Another ramification and embodiment of invention's separate parallel file constructs enable legal presentation customizations of prerecorded media content that is copyrighted and includes digital rights management (DRM) protection, as the underlying content is NOT altered and is NOT copied in any manner.

Another ramification and embodiment is based upon the invention's temporal marking indexes are used with web or video servers to only download or stream intervals of interest, thus dramatically reducing download file sizes and required bandwidths and saving users time, though legal use requires that the such video being downloaded legally permit such partial uses.

Another ramification and embodiment is based upon enabling new levels and types of fused content from multiple sources to be customize the viewing experiences for individuals and groups of individuals, including social networking interactions and "crowd sourcing" evolutions for many use cases. Customized media includes but is NOT limited to video, audio, virtual reality, games, 3D tracking files, operator interface screens, live camera, and/or sensor imagery or feeds.

Another ramification and embodiment of IntelliMarks dynamic customization include, but are not limited to state change commands or intervals commands to: "Skip over" such as unwanted advertisements or boring content; "Playback rate changes" with audio frequency shifting compensation to intelligibility (Above, Below, and Real-Time) to speed through lesser important parts while maintaining context, or slow-motion to highlight events of interest; "Repeatedly loop" for a designated number of times on an interval of interest or for training reinforcement; "Zoom Up" and "Zoom UP Centered on Areas of Interest" providing close up details of areas or events of interest; "Adding media" of other content within the presentation such as adding advertisements, annotations, or commentary; "Re-Sequencing" of collections of intervals such as adding back in the deleted scenes into the DVD movie playback; "Zoom, Placement, and Resizing" control to enable multiple content sources to be simultaneously displayed together; and/or "Semi-Transparently Superimposed Fusion" comprising additional semi-transparent layers which are also separate from the media content; and/or "Warping and Distortions" to avoid specific areas as in customizations to accommodate accessibility for vision impaired persons. Further, a "Restore Defaults" IntelliMark supports return to un-customized settings.

Ramifications of an improved automated method for altering the PRESENTATION of media content and/or live interactions where the original media content is unaltered thus not violating any copyright or terms of use restrictions. IntelliMarks are a separate collection of pointers that use file size or time pointers to enable the media content player to alter the presentation of the media content replay. Useful examples include adding an IntellMark-Begin-Skip, and IntellMark-End-Skip to skip over commercials or uninteresting parts, Intell-Mark-Play-At-Above-Real-Time-1.5× to speed up the rate of playback, zoom and other temporal and spatial presentation modifications are supported.

Additional Ramifications are based upon key innovations such as the use of IntelliMarks to insert the user's mini content into a playback such that the original content playback is paused, the user user's mini content is played, and then the original content playback is resumed. IntelliMarks also enables said mini-content inserts that are viewed by others to generate a score or monetary reward for the user that inserted the mini-content. For example: User #1 inserts his shaving ad mini-content, based upon a cool ad (with the permission of an advertiser that created the template) that shows a beautiful woman adding shaving cream to User #1 face (with a photoshop trick), User #1 IntellMark links in his personalized shaving advertisement with a cool YouTube video that shows "shaving through the ages" and places the IntellMark pointer within the video timeline so that his ad plays at a really funny time. User #1 shares the his IntelliMarks file and the associated YouTube video link on his Facebook page and Tweets it out. It goes viral, and every one of the 12 million views generates a penny from the shaving cream advertiser directly to User #1, with a gross return of $120,000 to User #1.

Additional Ramifications are based upon key innovations such as the use of IntelliMarks to insert the user's mini content semi-transparently and superimposed over top into a playback such that the original content playback is played, the user user's mini content is also played as commentary, annotation, or insult, while the original content playback continues. IntelliMarks also enables said mini-content inserts that are viewed by others to generate a score or monetary reward for the user that inserted the mini-content. For example: User #2 inserts his new car ad mini-content, based upon a cool ad (with the permission of an advertiser that created the template) that shows a beautiful woman getting into his car with User #2's smiling face video standing by the car semi-transparently with a big thumbs up gesture, and his verbal comments about the car being a "chick magnet," User #2 IntellMark links in his personalized new car ad advertisement with the original cool YouTube video that shows car ad and places the IntellMark pointer within the video timeline so that his ad plays at a really funny time. User #2 shares the his IntelliMarks file and the associated YouTube video link on his Facebook page and Tweets it out. It goes viral, and every one of the 50 million views generates a penny from the shaving cream advertiser directly to User #2, with a gross return of $500,000 to User #2.

Additional Ramifications are based upon key innovations such as IntelliMarks can be used to insert semi-transparent purchase hyper-links that will enable persons that insert mini-ads to directly profit based upon subsequent viewers that actually buy from their IntelliMarks embedded hyper-links.

Additional Ramifications are based upon key innovations such as multiple video layers within our MMT invention simultaneously playing back with separate IntelliMarks within each layer, included for synchronization, training, assessments, and/or after action reviews, as well as rapid easy to produce tutorial content production from real-world imagery, simulated virtual reality imagery, or ANY source.

Additional Ramifications are based upon key innovations implemented on digital video recorders, internet television boxes or software, entertainment and edutainment software or devices of all kinds.

Additional Ramifications of Methods and Systems of parallel separate software objects and hyperlinks index associated with other software objects such as files, streams, and controls that enable means for new levels and types of advertisements, coupons, rebates, and legal multi-level marketing business processes.

Thus the scope of the invention should be determined by the appended claims and their legal equivalents, and not be the examples given.

The invention claimed is:

1. A method, comprising:
   providing a display window on an electronic image display, the display window displays each displayed portion of media content of a media file;
   providing, during the display of the displayed portion of the media content of the media file, digitized data representing a value of information associated with a currently displayed portion of the media content of the media file via a non-transitory computer software executed by a processor;
   inserting, via the non-transitory computer software executed by the processor, at least one interval index in response to receiving at least one selection of at least one point on a video slider bar for the currently displayed portion and any subsequently displayed portions, each inserted interval index having a time duration included that is a separate date/time-stamp file index to affect subsequent playback of the media content in the media file to customize the presentation of the media content during the time duration associated with each inserted interval index;
   providing, via the non-transitory computer software executed by the processor, a context menu associated with the display window after each inserted interval index of the at least one inserted interval index, wherein the context menu provides user selectable commands to selectively insert a selected corresponding command for a corresponding one inserted interval index;
   storing, by the non-transitory computer software executed by the processor, the at least one inserted interval index and the inserted selected corresponding command for each corresponding one inserted interval index in a separate index file different from the media file; and
   executing the separate index file to cause, based on the at least one inserted interval index, the customized presentation of only those portions of the media content in the media file based on the inserted corresponding command of the corresponding one interval index of each corresponding displayed portion associated with the at least one inserted interval index without illegally altering or copying the media file when the media file is played back.

2. The method as set forth in claim 1, wherein prior to the inserting, the method further comprising:
   loading, by the non-transitory computer software executed by the processor, the media file for playback;
   opening, by the non-transitory computer software executed by the processor, a file name box to associate the separate index file with the media file; and
   playing back, by the non-transitory computer software executed by the processor, the media file.

3. The method as set forth in claim 2, further comprising:
   sharing the separate index file associated with the media content of the media file with a user at a remote location having a second processor,
   wherein the executing of the separate index file, by the second processor, causes only loading of said those portions of the media file associated with the at least one inserted interval index without illegally altering or copying the media content of the media file.

4. The method as set forth in claim 2, further comprising:
   providing, at the remote location, non-transitory software instructions executable by the second processor to cause:
   selectively deleting the at least one interval index of the separate index file;
   selectively modifying the at least one interval index of the separate index file; and
   selectively creating a new interval index to enable customization of the media content playback at the remote location without illegally altering or copying the media content of the media file.

5. The method as set forth in claim 1, wherein the user selectable commands include a loop segment command and further comprising:
   generating, by the non-transitory computer software executed by the processor, a loop segment, using a command script in response to receiving a selection of the loop segment command via the context menu, with the at least one interval index having a begin loop point, an end loop point and a repeat number to repeat the loop segment, the loop segment corresponding to a loop portion of the media content; and
   storing the loop segment in the separate index file wherein the executing of the separate index file causes the loop portion of the media content from the media file to be repeated the repeat number of times.

6. The method as set forth in claim 1, wherein the non-transitory computer software is compatible with a web-browser to access the media content.

7. The method as set forth in claim 6, wherein the media content comprises video content.

8. The method as set forth in claim 1, wherein the inserted corresponding command comprises a command script and further comprising:
   adding the command script of the inserted corresponding command to the separate index file, wherein the command script is configured to cause one of upon execution during playback of any one associated portion of said those portions:

modifying a rate of the playback;
annotating the any one associated portion with supplemental content to be superimposed over content of the any one associated portion during the playback;
zooming in on an area of interest in the any one associated portion during the playback;
freezing the any one associated portion during the playback thereof for a designated duration; and
annotating a ghost image to be superimposed over the any one associated portion during the playback.

9. The method as set forth in claim 8, wherein the media content is in a plurality of files and the at least one inserted interval index comprises a plurality of indexes to fuse together one of multiple recordings, streams or portions of the recordings and streams of the plurality of files during the playback.

10. The method as set forth in claim 1, further comprising:
storing an advertisement in the separate index file for insertion at a predetermined one inserted interval index; and
sharing the separate index file associated with the media content of the media file with a user at a remote location having a second processor,
wherein the executing of the separate index file, by the second processor, causes loading the media file and modifying during playback said those portions of the media content in the media file based on the inserted corresponding command of the corresponding one interval index associated with the at least one inserted interval index without illegally altering or copying the media content of the media file and presenting the advertisement at the predetermined one inserted interval index.

11. A system, comprising:
an electronic image display configured to display a display window, the display window being used to view each displayed portion of media content in a media file; and
a processor coupled to the electronic image display and having non-transitory computer software executed by the processor, the processor configured to:
provide, during the display of the displayed portion of the media content of the media file, digitized data representing a value of information associated with a currently displayed portion of the media content of the media file;
selectively insert at least one interval index in response to receiving at least one selection of at least one point on a slider bar for the currently displayed portion and any subsequently displayed portions, each interval index having a time duration included that is a separate date/time-stamp file index to affect subsequent playback of the media content in the media file to customize the presentation of the media file during the time duration associated with each inserted interval index;
provide a context menu associated with the display window after each inserted interval index of the at least one inserted interval index, wherein the context menu provides user selectable commands to selectively insert a selected corresponding command for a corresponding one inserted interval index;
store the at least one inserted interval index and the inserted selected corresponding command for each corresponding one inserted interval index in a separate index file different from the media file; and
selectively execute the separate index file to cause, based on the at least one inserted interval index, the customized presentation of only those portions of the media content in the media file based on the inserted corresponding command of the corresponding one interval index of a corresponding portion associated with the at least one inserted interval index without illegally altering or copying the media content of the media file.

12. The system as set forth in claim 11, wherein the processor further configured to:
load the media file for playback, prior to the at least one index being inserted;
open a file name box to associate the separate index file with the media file; and
play back the media file.

13. The system as set forth in claim 12, wherein the processor further configured to:
share the separate index file associated with the media content of the media file with a user at a remote location having a second processor; and
the system further comprising the second processor wherein the second processor configured to execute the separate index file to cause only loading of said those portions of the media file associated with the at least one inserted interval index without illegally altering or copying the media content of the media file.

14. The system as set forth in claim 13, wherein the second processor configured to:
selectively delete the at least one interval index of the separate index file;
selectively modify the at least one interval index of the separate index file; and
selectively create a new interval index to enable customization of the media content playback at the remote location without illegally altering or copying the media content of the media file.

15. The system as set forth in claim 11, wherein the user selectable commands include a loop segment command and the processor further configured to:
generate a loop segment, using a selectable command script in response to receiving a selection of the loop segment command via the context menu, with the at least one interval index having a begin loop point, an end loop point and a repeat number to repeat the loop segment, the loop segment corresponding to a loop portion of the media content; and
store the loop segment in the separate index file wherein when the processor executes the separate index file, the processor to cause the loop portion of the media content from the media file to be repeated the repeat number of times.

16. The system as set forth in claim 11, wherein the non-transitory computer software is compatible with a web-browser to access the media content.

17. The system as set forth in claim 16, wherein the media content comprises video content.

18. The system as set forth in claim 11, wherein the inserted corresponding command comprises a command script and the processor further configured to:
add the command script to the at least one interval index, wherein the command script configured to cause one of upon execution during playback of any one associated portion of said those portions:
modify to a rate of the playback;
annotate supplemental content to be superimposed over content associated with the any one associated portion during the playback thereof;
zoom in on an area of interest in the any one associated portion during the playback thereof;

freeze of the any one associated portion during the playback for a designated duration; and annotate a ghost image to be superimposed over the any one associated portion during the playback.

19. The system as set forth in claim 18, wherein the media content is in a plurality of files and the at least one interval index comprises a plurality of indexes to fuse together one of multiple recordings, streams or portions of the recordings and streams of the plurality of files during playback.

20. The system as set forth in claim 11, wherein the processor further configured to:

store an advertisement in the separate index file for insertion at a predetermined one inserted interval index; and share the separate index file associated with the media content of the media file with a user at a remote location having a second processor, wherein the execution of the separate index file, by the second processor, causes loading the media file and modifying during playback said those portions of the media content in the media file based on the inserted corresponding command of the corresponding one interval index associated with the at least one inserted interval index without illegally altering or copying the media content of the media file and presenting the advertisement at the predetermined one inserted interval index.

* * * * *